United States Patent [19]
Bailey et al.

[11] Patent Number: 5,923,555
[45] Date of Patent: Jul. 13, 1999

[54] WELDING SYSTEM

[75] Inventors: William Eastham Bailey, Lynchburg; Steven Darrell Overby, Rustburg; James Patterson Bryant, Evington, all of Va.

[73] Assignee: Framatome Technologies, Inc., Lynchburg, Va.

[21] Appl. No.: 08/867,050

[22] Filed: Jun. 2, 1997

Related U.S. Application Data

[51] Int. Cl.[6] ..................................................... H04N 7/18
[52] U.S. Cl. ...................................... 364/468.21; 348/90
[58] Field of Search ............................... 395/94; 356/3.1; 348/90; 364/148, 138, 167.01, 468.01, 468.21; 702/94, 150, 188

[56] References Cited

U.S. PATENT DOCUMENTS

| | | | |
|---|---|---|---|
| 4,212,031 | 7/1980 | Schmitt et al. | 358/101 |
| 4,649,426 | 3/1987 | Bolstad | 348/90 |
| 4,822,163 | 4/1989 | Schmidt | 356/3.03 |
| 4,857,260 | 8/1989 | Schoenig, Jr. et al. | 376/245 |
| 4,877,940 | 10/1989 | Bangs et al. | 219/124.34 |
| 4,907,169 | 3/1990 | Lovoi | 395/94 |
| 5,359,672 | 10/1994 | Okumura et al. | 382/18 |
| 5,380,978 | 1/1995 | Pryor | 219/121.64 |
| 5,439,157 | 8/1995 | Geier et al. | 228/9 |
| 5,511,007 | 4/1996 | Nihei et al. | 364/571.01 |
| 5,517,420 | 5/1996 | Kinsman et al. | 364/474.08 |
| 5,554,837 | 9/1996 | Goodwater et al. | 219/121.63 |
| 5,572,102 | 11/1996 | Goodfollow et al. | 318/568.13 |

OTHER PUBLICATIONS

Brochure from Olympus Industreis entitled "The New Generation Of Rigid Borescopes"; Undated Admitted Prior Art.
Camera specification sheet from Rees Industries Ltd. Feb. 1, 1994.

*Primary Examiner*—John Barlow
*Assistant Examiner*—Craig Steven Miller
*Attorney, Agent, or Firm*—Rhodes Coats & Bennett, L.L.P.

[57] ABSTRACT

A welding system for automatically welding two workpieces together at a joint. The system includes a welding box having an electrode for welding the workpieces together; a camera assembly for viewing selected regions of the workpieces including a first edge and a second edge of the joint; and a controller connected to the camera assembly and the welding box for receiving the location of the first edge and the second edge of the joint and calculating the centerline of the joint and providing an output signal representative of the difference of the relative position of the centerline of the joint and the centerline of the fusing element. In the preferred embodiment, a 2-axis light source illuminates the surface of the workpieces to better locate the centerline of the joint.

41 Claims, 7 Drawing Sheets

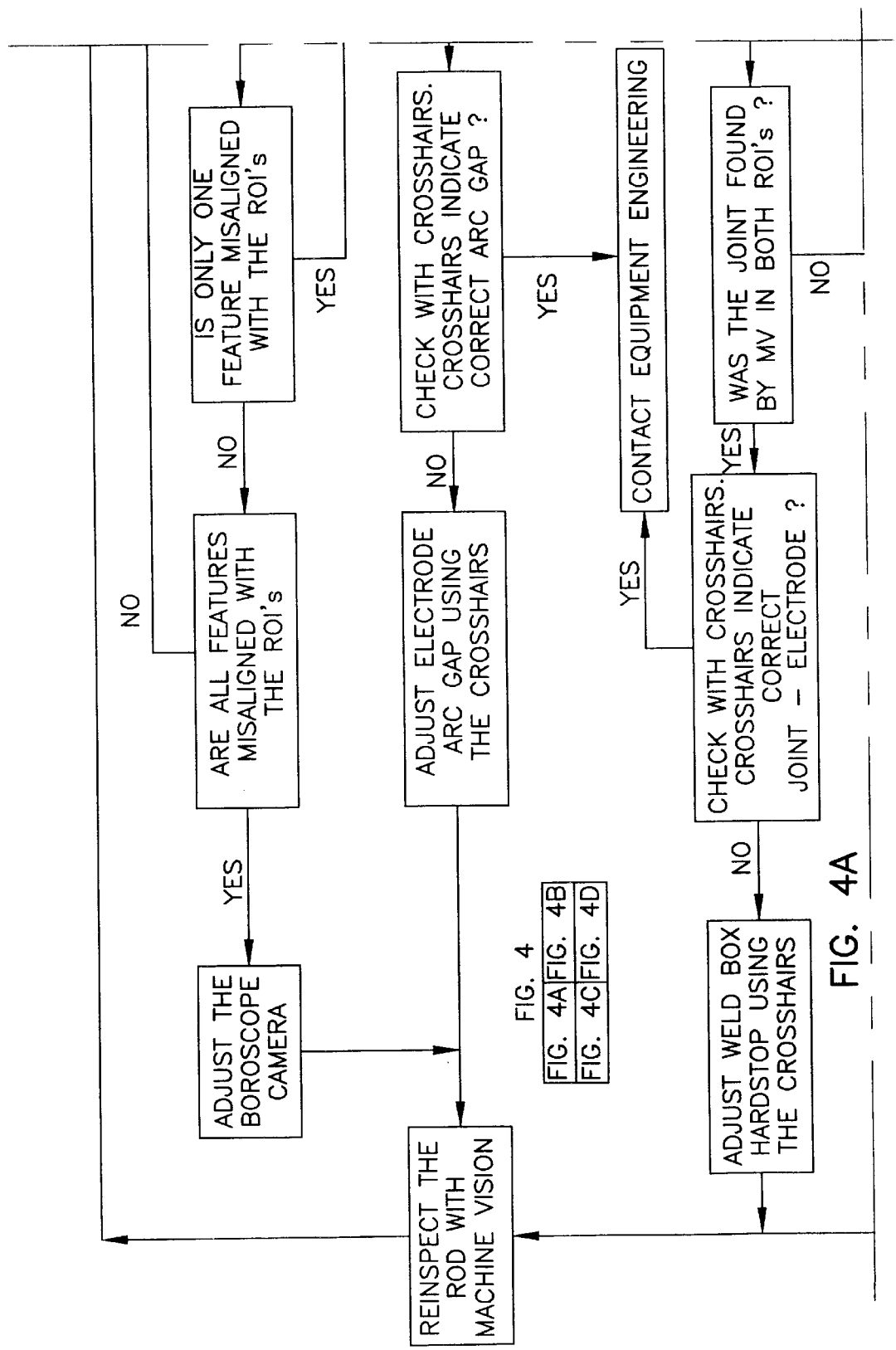

WELDING SYSTEM

BACKGROUND OF THE INVENTION

1. Field of the Invention

The present invention relates generally to automatic welding systems and, more particularly, to an automatic welding system for precisely welding end caps to nuclear fuel rods.

2. Description of the Prior Art

Welding end caps onto a nuclear fuel rod is a critical operation since failure of the weld can result in a leaking fuel rod that may result in an unscheduled plant outage. Such outages are extremely expensive and may result in an unnecessary increase in radiation exposure to plant personnel. While vision systems have been tried to help improve weld quality, such systems have had significant difficulties in viewing highly reflective surfaces such as zirconia fuel rods.

U.S. Pat. No. 5,359,672 to Okumura et al., discloses a method of welding using parallel windows of an image to align welds. Prior to welding, data from the windows is used to recognize a weld line, and the inclination and characteristic values of the weld line. Each of the rectangular windows are deformed into a parallelogram-shaped window along the inclination of the detected weld line.

U.S. Pat. No. 5,554,837 to Goodwater et al., discloses an interactive laser welder having a vision system, which digitizes the weld area to determine the weld path.

U.S. Pat. No. 5,572,102 to Goodfellow et al., discloses a vision system for controlling welding robots. The vision system includes an unoriented light source for illuminating a part to be welded so that a light intensity gradient is created along a seam to be welded. An image of the light intensity gradient is captured by one or more solid-state video cameras. The image is compared with a stored image of a reference so that a deviation of the seam to be welded with respect to the seam of the reference part can be computed for each of a plurality of predefined reference points. The deviation at each reference point is translated by a microprocessor into a coordinate adjustment which is downloaded to a controller for the robot. The controller converts the learned coordinates of the reference part into the actual coordinates of the seam to be welded using the coordinate adjustments provided by the microprocessor, permitting the robot to weld the seam without vision sensing or weld path adjustments during the welding process.

U.S. Pat. No. 5,511,007 to Nihei et al., provides a method in which data obtained from a real-time sensor is stored during the operation of a robot, such as a welding robot, for later diagnosis of the operational state of the sensor. The method includes the steps of scanning an object by using a laser sensor to obtain sectional data, detecting a weld line position on the basis of the sectional data, storing in memory the weld line position along with the robot positions corresponding to the time of detection, and storing in memory the sectional data when a predetermined robot position is reached. The operational state of this sensor is traced on the basis of the weld line position and the sectional data stored in memory. Various parameters for detection are set so that an optimum state for detection is established.

None of the above-referenced patents appear to solve the problem of viewing a highly reflective fuel rod or to recognize the importance of measuring the centerline of the electrode with respect to the centerline of the pre-weld arc gap to improve the quality of the weld. In addition, none of the references appear to use this information before and after the welding operation to provide an indication of weld quality.

Thus, there remains a need for a new and improved welding system which is sufficiently sensitive to detect an arc gap of a highly reflective metal rod while, at the same time, uses this information to accept or reject the quality of the end cap weld.

SUMMARY OF THE INVENTION

The present invention is directed to a welding system for welding end caps on nuclear fuel rods. A camera assembly and a control system are used to insure proper alignment of the end caps with respect to the fuel rods as well as insuring proper alignment of the welding electrode. The system divides an image of the welding electrode, end cap and fuel rod into multiple regions of interest (ROI). Each ROI is analyzed by the control system to determine the location of a particular feature or object. The control system then determines the placement and alignment of the electrode, end cap and fuel rod and makes the weld. After welding the weld region is re-examined and, if a unwelded joint is detected, the rod is rejected.

Accordingly, one aspect of the present invention is to provide a welding system for automatically welding two workpieces together at a joint. The system includes: (a) a welding box having a fusing element for welding the workpieces together; (b) a camera assembly for viewing selected regions of the workpieces; and (c) a control system connected to the camera assembly and the welding box for locating the centerline of the joint with respect to the centerline the fusing element and providing an output signal representative of the difference of their relative positions.

Another aspect of the present invention is to provide a control system for a welding box including a fusing element for welding two workpieces together at a joint. The control system includes: (a) a camera assembly for viewing selected regions of the workpieces including a first edge and a second edge of the joint; and (b) a controller connected to the camera assembly and the welding box for receiving the location of the first edge and the second edge of the joint and calculating the centerline of the joint and providing an output signal representative of the difference of the relative position of the centerline of the joint and the centerline of the fusing element.

Still another aspect of the present invention is to provide a welding system for automatically welding two workpieces together at a joint. The system includes: (a) a welding box having a fusing element for welding the workpieces together; (b) a camera assembly for viewing selected regions of the workpieces including a first edge and a second edge of the joint; (c) a controller connected to the camera assembly and the welding box for receiving the location of the first edge and the second edge of the joint and calculating the centerline of the joint and providing an output signal representative of the difference of the relative position of the centerline of the joint and the centerline of the fusing element; and (d) a 2-axis light source for illuminating the surface of the workpieces to locate the centerline of the joint.

These and other aspects of the present invention will become apparent to those skilled in the art after a reading of the following description of the preferred embodiment when considered with the drawings.

BRIEF DESCRIPTION OF THE DRAWINGS

FIGS. 4a, 4b, 4c and 4d are flow charts of the control system of the present invention shown in FIG. 1; and FIG. 5 is a side view of the light assembly of the present invention shown in FIG. 1.

DESCRIPTION OF THE PREFERRED EMBODIMENTS

Figure 1:
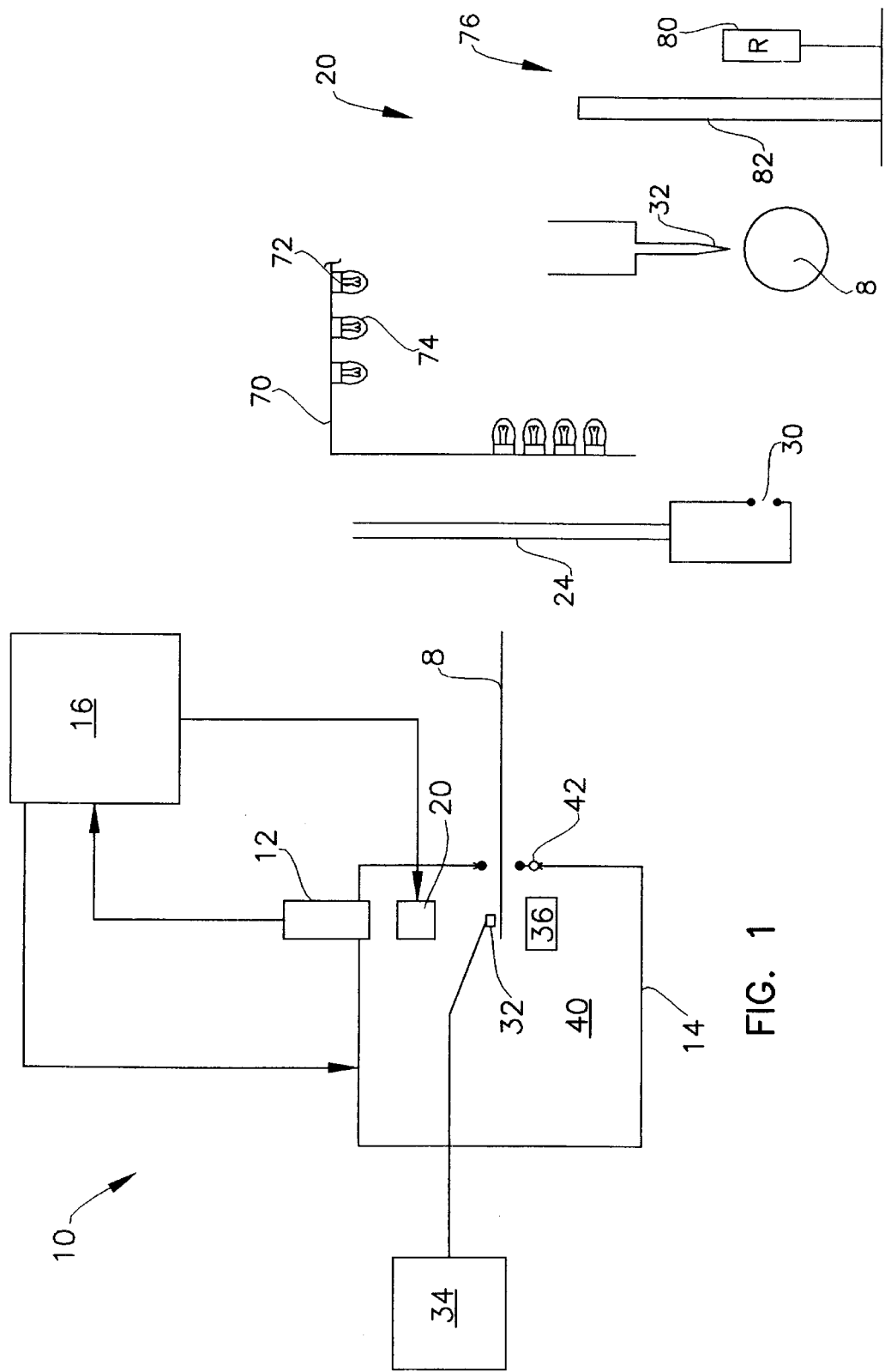
FIG. 1 is a schematic diagram of a Welding System constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a welding system, generally designated 10, is shown constructed according to the present invention. The welding system 10 includes four major sub-assemblies: a camera assembly 12; a weld box 14; a control system 16; and a 2-axis lighting system 20.

Figure 2:
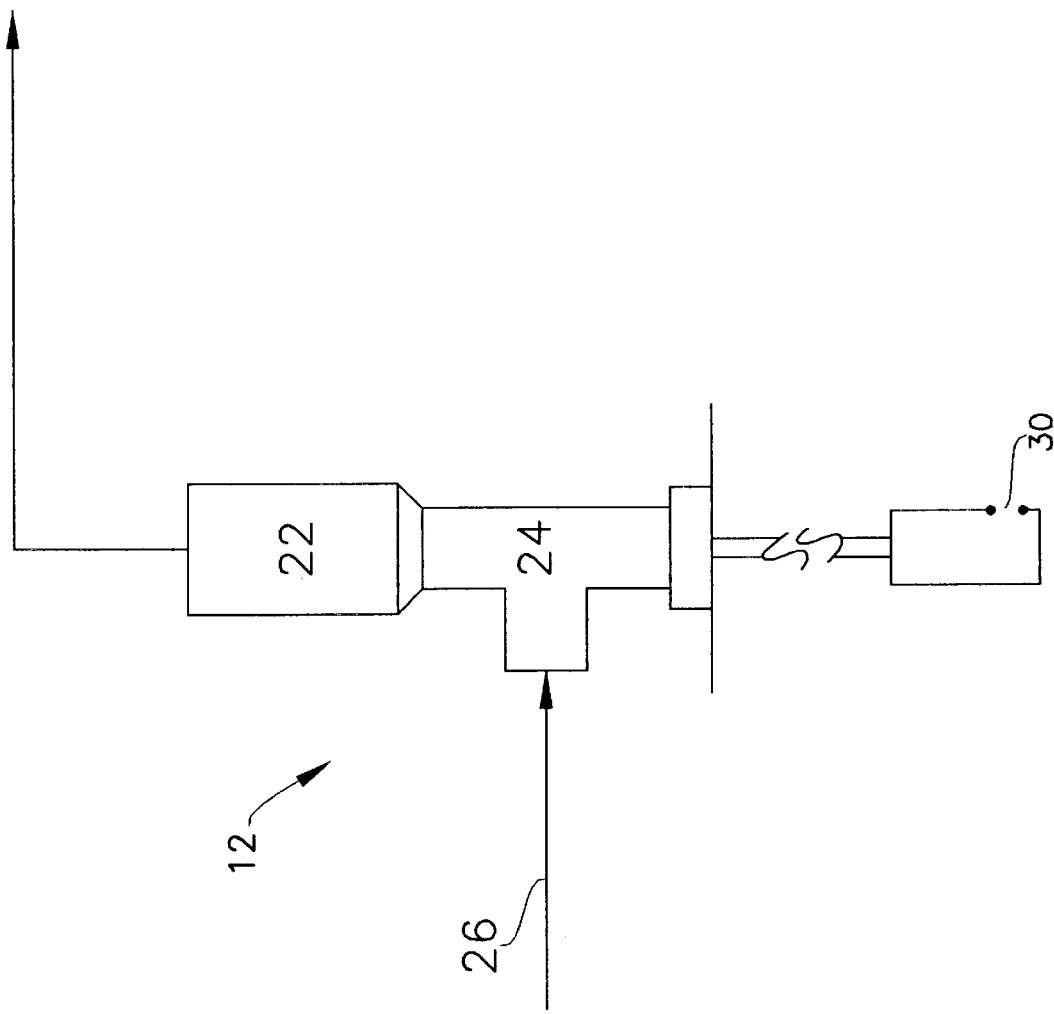
FIG. 2 is an enlarged view of the camera assembly shown in FIG. 1.

As shown in FIG. 2, the camera assembly 12 includes a charged coupled device video camera 22 mounted to a borescope 24 for viewing the welding operation taking place in the welding box in real time. One such the vision system is available from Acuity Imaging, Inc. of Nashua, N.H. In the preferred embodiment, the borescope is a Series 5 Borescope available from Olympus America, Inc. of Melville, N.Y. The camera 22 sends an output signal to the control system 16, which controls the operation of the fusing element. A suitable control system is an Allen Bradley PLC Model SLC 5/04. The camera assembly 12 also includes a set-up light 26 to illuminate the interior of the weld box 14 prior to initiating the welding operation. A vacuum sheath 30 protects the end of the borescope from the internal atmosphere in the welding box.

Returning to FIG. 1, the weld box 14 includes a power supply 34 for a fusing element, which in the preferred embodiment is an electrode 32. A laser may also serve as the fusing element. The weld box 14 also includes a means for rotating the electrode 32 with respect to the nuclear fuel rod cladding 8 so that, in operation, the electrode 32 circumferentially welds the end cap 18 to the fuel rod cladding 8. The weld box 14 also includes a chamber 40, which may be pressurized with a mixture of helium gas and argon gas while the welding system is in operation. An airlock 42 prevents outside air from entering the weld box 14 while the welding system is in operation. Such pressurization in combination with the airlock 42 prevents contaminants from entering the weld box 14 during operation. While the welding system is not in operation, the chamber 40 is purged.

Figure 3:
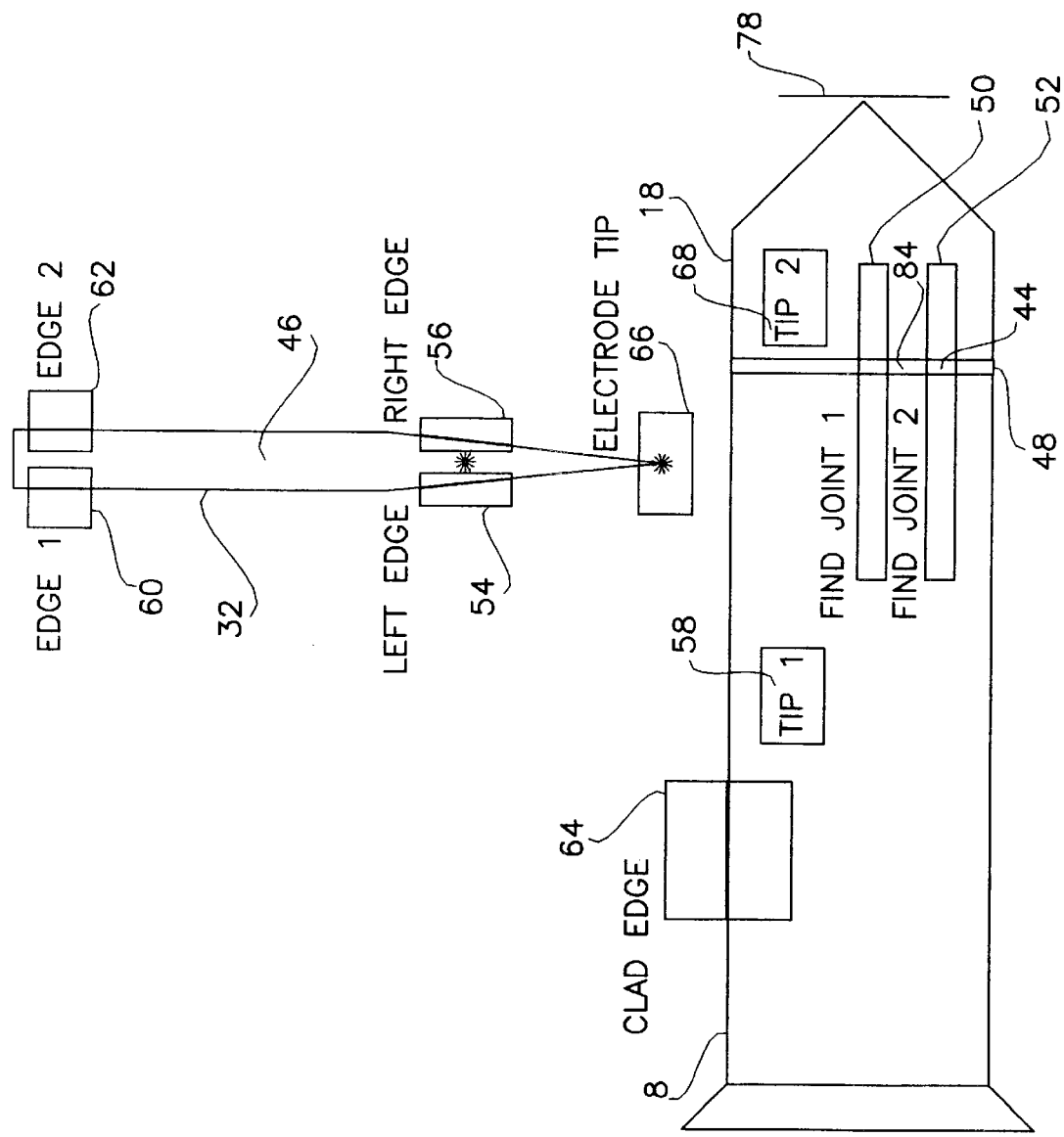
FIG. 3 depicts the regions of interest utilized by the control system of the present invention shown in FIG. 1.
Figure 4B:
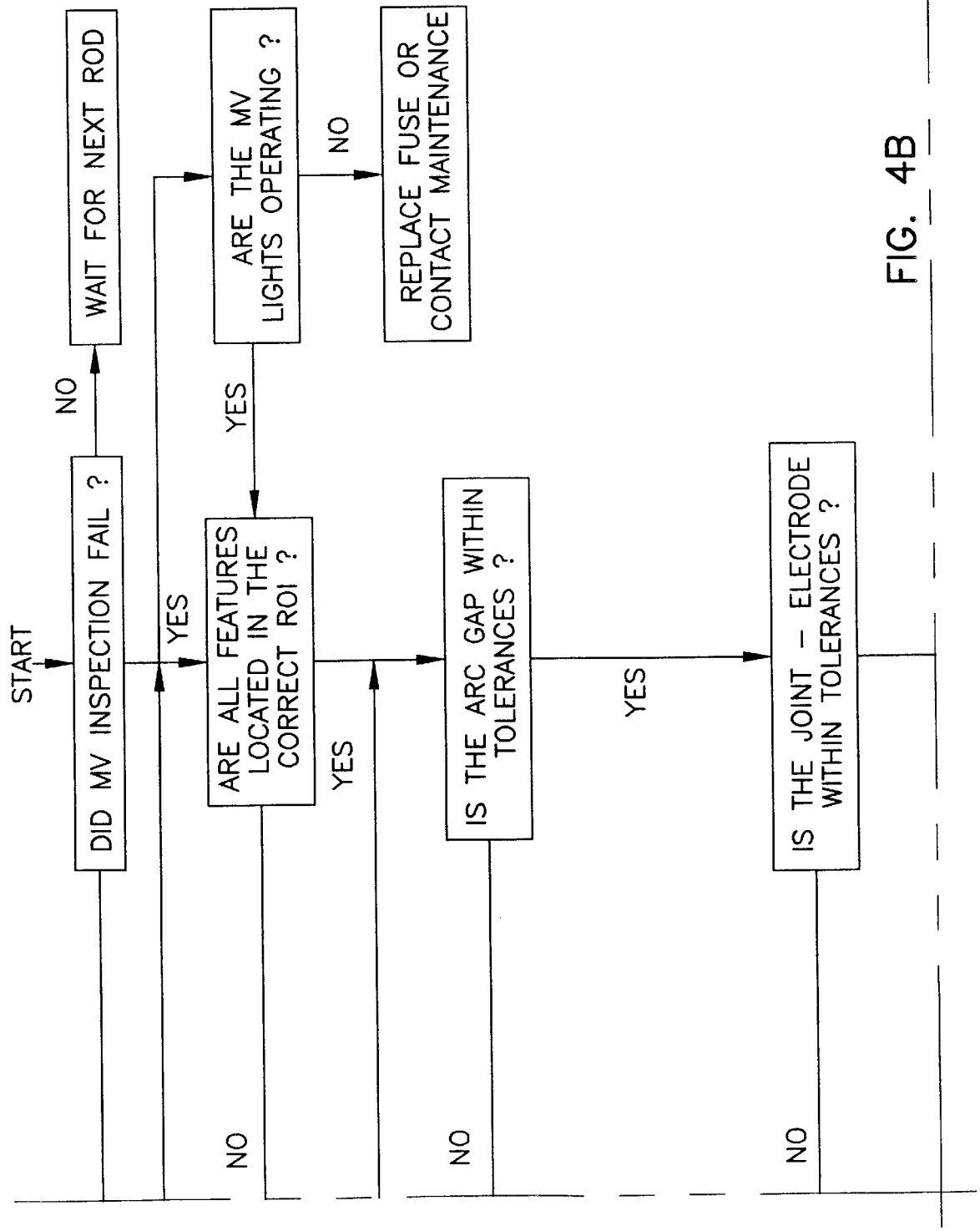
Figure 4C:
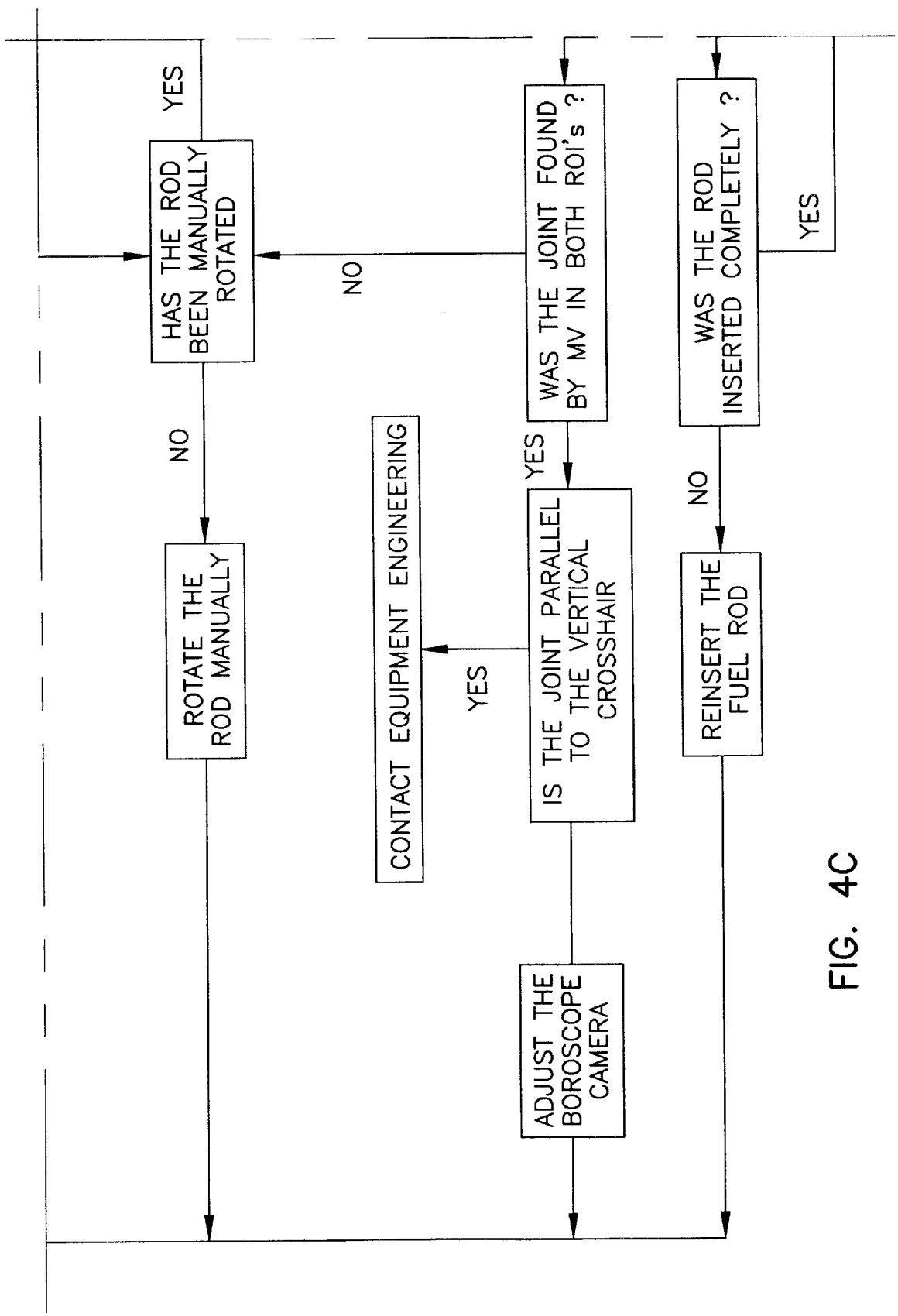
Figure 4D:
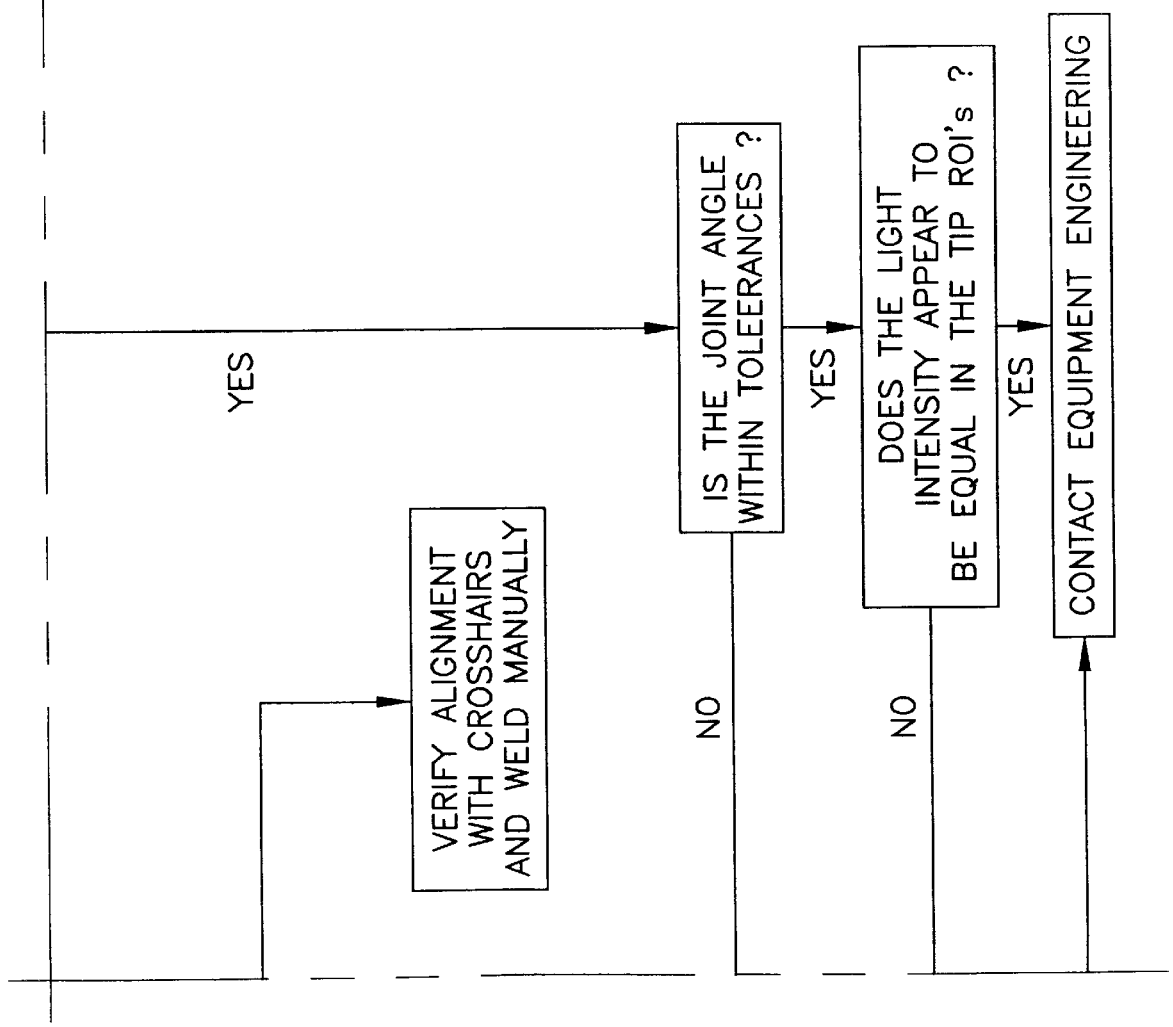

As best seen in FIG. 3, the control system 16 (shown in FIG. 1) divides an image of the electrode 32, the end cap 18 and fuel rod cladding 8 into multiple regions of interest (ROI). Each ROI is analyzed by the control system 16 to determine where to find a particular feature or object. The control system 16 will analyze each ROI to determine the placement and alignment of the electrode 32, end cap 18 and fuel rod cladding 8. Preferably, there are 10 ROIs named and defined as follows:

| | |
|---|---|
| Edge 1 60 | Identifies the location of the left edge of the electrode 32. |
| Edge 2 62 | Identifies the location of the right edge of the electrode 32. |
| Left Edge 54 | Identifies the location of the left edge of the angled portion of the electrode 32 leading to the electrode tip 66. |
| Right Edge 56 | Identifies the location of the right edge of the angled portion of the electrode 32 leading to the electrode tip 66. |
| Electrode Tip 66 | Identifies the location of the tip or bottom of the electrode 32. |
| Clad Edge 64 | Identifies the location of the top of the fuel rod cladding. |
| Tip 1 58 | Identifies the location of the fuel rod cladding 8. |
| Tip 2 68 | Identifies the location of the end cap 18. |
| Find Joint 1 50 | Identifies a first location of the fuel rod cladding 8 to end cap joint 44. |
| Find Joint 2 52 | Identifies a second location of the fuel rod cladding 8 to end cap joint 44. |

Each of the above ROIs are used to locate features on an image of the electrode 32, fuel rod cladding 8 and end cap 18 to determine measurements necessary for proper alignment and welding.

There are 4 primary measurements made and checked by the control system 16: 1) arc gap, 2) joint/electrode alignment, 3) joint angle, and 4) tip difference. The arc gap measures the vertical distance from the electrode tip 66 to the top of the fuel rod cladding 8. The ROIs used to obtain the arc gap measurement are the electrode tip 66 and the clad edge 64. The location of the electrode tip 66 is used to determine the bottom of the electrode 32 and the location of the clad edge 64 is used to find the top of the fuel rod cladding 8. Once these two points are located, the control system 16 calculates the vertical distance between them.

The joint/electrode alignment measures the horizontal distance from the electrode centerline 46 to the cladding/end cap joint centerline 44. The ROIs used to obtain this measurement are left edge 54, right edge 56, find joint 1 50 and find joint 2 52. Edge 1 60 and edge 2 62 help locate the left edge 54 and right edge 56 of the electrode 32. The electrode centerline 46 is determined to identify the location of the electrode tip 66 relative to the joint centerline 44. The control system 16 determines the location of the cladding/end cap joint centerline 44 by locating find joint 1 50 and find joint 2 52. The control system 16 also determines the center point 84 on the cladding/end cap joint centerline 44 based on the location of the find joint 1 50 and find joint 2 52.

The joint angle is the angle of the cladding/end cap joint centerline 44 relative to the horizontal axis of the fuel rod. The tip difference compares gray scale values of the tip 1 58 and tip 2 68 to verify that the end cap 18 is completely seated against a weld box hard stop 78.

There are further subject measurements made by the control system 16, which are transparent to the operator of the welding system. The pass/fail status of these subject measurements is not monitored. There is a hierarchy to all measurements. The subject measurements are the lowest in the hierarchy and must be correct for the four primary measurements to pass. Thus, if one of the subject measurements fails, then at least one of the primary measurements will fail, resulting in an alarm to the operator. The four subject measurements are the midpoint measurement, the joint location, the electrode center point, and the electrode center location.

The midpoint measurement is the center point location 84 between the find joint 1 50 and find joint 2 52. Although there is no physical value assigned to the midpoint measurement, it must be established in order to assign a value to the location of the cladding/end cap joint 48.

The joint location measurement is the physical location of the above referenced midpoint measurement. It is first necessary to calculate the midpoint measurement and then this measurement assigns a value as referenced from the left edge of the camera field of view as displayed on the video monitor.

The electrode center point is the center point location between the left edge 54 and right edge 56. There is no physical value assigned and displayed with the electrode center point. The midpoint must be established in order to assign a value to the electrode center point.

The electrode center location measurement is the physical location, in inches or as calibrated, of the above referenced electrode center point. It is first necessary to locate the electrode center point and then this measurement assigns a value as referenced from the left edge of the camera field of view, as displayed on the video monitor.

The tip 1 measurement is a gray scale measurement for tip 1 58. It is an average gray scale value for the complete tip 1 58 ROI.

The tip 2 measurement is a gray scale measurement for tip 2 68. It is an average gray scale value for the complete tip 2 68 ROI.

As can be seen in FIG. 5, the 2-axis light source 20 includes an L-shaped array 70 to which a plurality of lights 72 are secured. The lights 72 are arranged in rows 74, 75 perpendicular to the workpiece. In the preferred embodiment, lights 72 include a plurality of rows which are arranged in columns parallel to the workpiece (only the end columns are shown in FIG. 5). The rows and columns of lights 72 form two planes of lights which are angled both with respect to each other and to the workpiece (2-axis). The 2-axis light source 70 illuminates the fuel rod cladding 8 and provides significantly better viewing of the reflective surface of the workpiece than has been found possible from a single light source which generally produces only a narrow line of reflection back to the camera.

The light source 20 also includes a back light assembly 76, which includes a light source 80, and a diffuser 82. When illuminated, the back light assembly 76 enhances the image of the electrode 32 and fuel rod cladding 8.

In operation, the control system 16 operates in conjunction with the camera assembly 12 to ensure that the electrode 32, fuel rod cladding 8 and end cap 18 are located within the correct ROI. Once each feature falls within the correct ROI, the control system 16 interacts with an operator through the display to properly align the electrode, fuel rod and end cap for welding.

Certain modifications and improvements will occur to those skilled in the art upon a reading of the foregoing description. By way of example, other 2-axis lighting arrangements could be used such as a pair of fiber optic line lights. When using line lights, the advantages of the 2-axis light source 70 are obtained by again orienting the lights both with respect to one another and the workpiece. This arrangement can be thought of like partially opening a book and then turning the top edges of partially opened book towards one another. In addition, the fuel rod could be rotated with respect to a stationary fusing element. This is particularly useful for laser welding boxes which use a stationary laser element. It should be understood that all such modifications and improvements have been deleted herein for the sake of conciseness and readability but are properly within the scope of the following claims.

We claim:

1. A welding system for automatically welding two workpieces together at a joint, said system comprising:
    (a) a welding box having a fusing element for welding said workpieces together;
    (b) a camera assembly for viewing selected regions of said workpieces; and
    (c) a control system connected to said camera assembly and said welding box for locating the centerline of said joint with respect to the centerline said fusing element and providing an output signal representative of the difference of their relative positions.

2. The apparatus according to claim 1, further including a 2-axis light source for illuminating the surface of said workpieces to locate said centerline of said joint.

3. The apparatus according to claim 2, wherein said 2-axis light source is L-shaped.

4. The apparatus according to claim 3, wherein said 2-axis light source includes a plurality of lights arranged in rows.

5. The apparatus according to claim 4, wherein said plurality of lights arranged in rows are oriented in one direction on one portion of said L-shape and another direction on another portion of said L-shape.

6. The apparatus according to claim 2, further including a backlight for illuminating the surface of said fusing element to locate said centerline of said fusing element.

7. The apparatus according to claim 6, wherein said backlight includes a light source and a diffuser located between said light source and said camera assembly.

8. The apparatus according to claim 1, wherein said camera assembly includes a borescope attached to said welding box and a camera attached to said borescope.

9. The apparatus according to claim 8, wherein said camera is a video camera having video pulse synchronization.

10. The apparatus according to claim 8, wherein said borescope includes a vacuum sheath.

11. The apparatus according to claim 8, wherein said borescope includes a set-up light source.

12. The apparatus according to claim 1, wherein said fusing element is an electrode and a power supply.

13. The apparatus according to claim 1, wherein said fusing element is a laser and a power supply.

14. The apparatus according to claim 1, wherein said welding box includes means for moving said fusing element and said workpieces with respect to one another.

15. The apparatus according to claim 1, wherein said welding box includes a chamber for containing a cover gas.

16. The apparatus according to claim 15, wherein said welding box includes an air lock for allowing said workpieces to be inserted into said chamber containing a cover gas.

17. A control system for a welding box including a fusing element for welding two workpieces together at a joint, said system comprising:
    (a) a camera assembly for viewing selected regions of said workpieces including a first edge and a second edge of said joint; and
    (b) a controller connected to said camera assembly and said welding box for receiving the location of said first edge and said second edge of said joint and calculating the centerline of said joint and providing an output signal representative of the difference of the relative position of the centerline of said joint and the centerline of said fusing element.

18. The apparatus according to claim 17, wherein said fusing element is an electrode and said camera assembly views selected regions of said electrode including a first edge and a second edge and said controller calculates the center of said electrode.

19. The apparatus according to claim 17, wherein said fusing element is an electrode and said camera assembly views selected regions of said electrode including a first lower edge and a second lower edge and a first upper edge and a second upper edge and said controller calculates the centerline of said electrode.

20. The apparatus according to claim 17, wherein said fusing element is an electrode and said camera assembly views selected regions of said electrode including its tip and a first edge of one of said workpieces and said controller calculates the positions of said tip and said first edge of one of said workpieces and provides an output signal representative of the difference of the relative position of said tip and said first edge of one of said workpieces.

21. A welding system for automatically welding two workpieces together at a joint, said system comprising:
(a) a welding box having a fusing element for welding said workpieces together;
(b) a camera assembly for viewing selected regions of said workpieces including a first edge and a second edge of said joint;
(c) a controller connected to said camera assembly and said welding box for receiving the location of said first edge and said second edge of said joint and calculating the centerline of said joint and providing an output signal representative of the difference of the relative position of the centerline of said joint and the centerline of said fusing element; and
(d) a 2-axis light source for illuminating the surface of said workpieces to locate said centerline of said joint.

22. The apparatus according to claim 21, wherein said 2-axis light source is L-shaped.

23. The apparatus according to claim 22, wherein said 2-axis light source includes a plurality of lights arranged in rows.

24. The apparatus according to claim 23, wherein said plurality of lights arranged in rows are oriented in one direction on one portion of said L-shape and another direction on another portion of said L-shape.

25. The apparatus according to claim 21, further including a backlight for illuminating the surface of said fusing element to locate said centerline of said fusing element.

26. The apparatus according to claim 25, wherein said backlight includes a light source and a diffuser located between said light source and said camera assembly.

27. The apparatus according to claim 21, wherein said camera assembly includes a borescope attached to said welding box and a camera attached to said borescope.

28. The apparatus according to claim 27, wherein said camera is a video camera having video pulse synchronization.

29. The apparatus according to claim 27, wherein said borescope includes a vacuum sheath.

30. The apparatus according to claim 27, wherein said borescope includes a set-up light source.

31. The apparatus according to claim 21, wherein said fusing element is an electrode and a power supply.

32. The apparatus according to claim 21, wherein said fusing element is a laser and a power supply.

33. The apparatus according to claim 21, wherein said welding box includes means for moving said fusing element and said workpieces with respect to one another.

34. The apparatus according to claim 21, wherein said welding box includes a chamber for containing a cover gas.

35. The apparatus according to claim 34, wherein said welding box includes an air lock for allowing said workpieces to be inserted into said chamber containing a cover gas.

36. The apparatus according to claim 21, wherein said fusing element is an electrode and said camera views selected regions of said electrode including a first edge and a second edge and said controller calculates the center of said electrode.

37. The apparatus according to claim 21, wherein said fusing element is an electrode and said camera assembly views selected regions of said electrode including a first lower edge and a second lower edge and a first upper edge and a second upper edge and said controller calculates the centerline of said electrode.

38. The apparatus according to claim 21, wherein said fusing element is an electrode and said camera assembly views selected regions of said electrode including its tip and a first edge of one of said workpieces and said controller calculates the positions of said tip and said first edge of one of said workpieces and provides an output signal representative of the difference of the relative position of said tip and said first edge of one of said workpieces.

39. A method for automatically welding two workpieces together at a joint using a fusing element, said method comprising the steps of:
(a) viewing selected regions of said workpieces using a camera;
(b) locating the centerline of said joint with respect to the centerline of said fusing element and providing an output signal representative of the difference of their relative positions using a control system connected to said camera;
(c) using said output signal to control the position of said fusing element; and
(d) welding said workpieces together.

40. A method for controlling the position of a fusing element for welding two workpieces together at a joint, said method comprising the steps of:
(a) viewing selected regions of said workpieces including a first edge and a second edge of said joint using a camera; and
(b) receiving the location of said first edge and said second edge of said joint and calculating the centerline of said joint and providing an output signal representative of the difference of the relative position of the centerline of said joint and the centerline of said fusing element.

41. A method for automatically welding two workpieces together at a joint using a fusing element, said method comprising the steps of:

(a) illuminating the surface of said workpieces to locate said centerline of said joint using a 2-axis light source;
(b) viewing selected regions of said workpieces including a first edge and a second edge of said joint using a camera;
(c) receiving the location of said first edge and said second edge of said joint and calculating the centerline of said joint and providing an output signal representative of the difference of the relative position of the centerline of said joint and the centerline of said fusing element using a control system connected to said camera;
(d) using said output signal to control the position of said fusing element; and
(e) welding said workpieces together.

* * * * *